United States Patent [19]

Hofmann

[11] Patent Number: 5,981,008
[45] Date of Patent: Nov. 9, 1999

[54] POLYMER BLENDS

[75] Inventor: George Henry Hofmann, Wilmington, Del.

[73] Assignee: E. I. du Pont de Nemours and Company, Wilmington, Del.

[21] Appl. No.: 09/168,487

[22] Filed: Oct. 8, 1998

Related U.S. Application Data

[60] Division of application No. 08/955,724, Oct. 22, 1997, Pat. No. 5,865,405, which is a continuation-in-part of application No. 08/701,519, Aug. 22, 1996, abandoned
[60] Provisional application No. 60/002,851, Aug. 28, 1995.

[51] Int. Cl.$^6$ .................................................. B29D 22/00
[52] U.S. Cl. .................... 428/35.7; 428/35.4; 428/474.4; 525/66; 525/179
[58] Field of Search ................... 428/35.7, 35.4; 525/66, 179

[56] References Cited

U.S. PATENT DOCUMENTS 3,780,140  12/1973  Hammer .................................. 525/183
4,174,358  11/1979  Epstein .................................. 525/183
5,352,735  10/1994  Hoffman .................................. 525/63

FOREIGN PATENT DOCUMENTS

| 0336680 | 10/1989 | European Pat. Off. . |
| 0369604 | 5/1990 | European Pat. Off. . |
| 61-034059 | 2/1986 | Japan .............................. C08L 23/26 |
| 61-34060 | 2/1986 | Japan . |
| WO A 93 02138 | 2/1993 | WIPO .............................. C08L 27/04 |

*Primary Examiner*—Ana Woodward
*Attorney, Agent, or Firm*—Patricia L. Kelly

[57] ABSTRACT

Halide polymers such as polyvinyl chloride and polyamides melt blended at a polyamide to halide polymer weight ratio of about 1.5:1 to about 2:1 with an effective amount of a carboxyl and/or CO-functional ethylene polymer to compatibilize the halide polymer and polyamide exhibit superior chemical resistance.

4 Claims, No Drawings

POLYMER BLENDS

This is a division of Application No. 08/955,724 filed Oct. 22, 1997, now U.S. Pat. No. 5,865,405, incorporated by reference herein, which is a continuation-in-part of U.S. Application No. 08/701,519, filed Aug. 22, 1996, now abondoned which claims benefit of U.S. Provisional Application No. 60/002,851, filed Aug. 28, 1995.

FIELD OF THE INVENTION

This invention relates to blends of vinyl halide or vinylidene halide polymer and polyamide together with a compatibilizing polymer in such a ratio to give tough, flexible, chemically resistance compositions suitable for wire and cable jacketing and chemically resistant liners.

BACKGROUND OF THE INVENTION

U.S. Pat. No. 5,352,735 (Hofmann), incorporated herein by reference, discloses the discovery that vinyl halide or vinylidene halide polymer and polyamide can be melt blended under certain conditions that the relatively low melting halide polymer does not degrade, and that useful blended products are obtained. The process of U.S. Pat. No. 5,352,735 comprises melt blending the halide polymer and polyamide together at a temperature of less than about 220° C., with the polyamide being melt processible at the temperature of the melt blending, in the presence of an effective amount of ethylene polymer having carbon monoxide and/or carboxyl functionality to compatibilize the halide polymer with the polyamide. U.S. Pat. No. 5,352,735 also teaches compositions comprising these polymer components, but contains no teaching or suggestion regarding the chemical resistance of the resulting compositions. It teaches that the halide polymer and the polyamide proportions may vary widely (5 to 95 weight percent of each based on 100 weight percent of the two polymers). All the examples have the polyamide present in a quantity that is 1.3 times the weight of PVC polymer in the blend.

SUMMARY OF THE INVENTION

The present invention involves the discovery of improved compositions of a vinyl halide or vinylidene halide polymer, a polyamide, and a compatibilizing ethylene polymer having carbon monoxide and/or carboxyl functionality. These compositions display an outstanding balance of properties which include chemical resistance, toughness and low temperature flexibility.

Particularly, the compositions of this invention comprise those with a volume swell of less than about 20% with a retention of tensile strength greater than about 60% after seven (7) days of soaking in Fuel C (a 50/50 mixture of isooctane and toluene) at room temperature. The polyamide of this invention is present in the composition an amount 1 ½ to 2 times the amount of the halide polymer in the blend and the ethylene polymer having carbon monoxide and/or carboxyl functionality is present in an amount up to 80 weight percent based on halide polymer content.

DETAILED DESCRIPTION OF THE INVENTION

Plasticized polyvinyl chloride (PVC) is the single largest volume electrical insulating material in use today. It has good electrical properties as well as very good abrasion and moisture resistance. Flexible PVC insulations are applied in building wires, power cables, appliance wiring, automotive wiring, communications wiring, etc.

A particularly high performance insulation, defined by the Underwriters Laboratory as a THHN construction, consists typically of a 15 mil (0.38 mm) insulation layer of flexible PVC covered with a 4 mil (0.10 mm) sheath or jacket of polyamide. The insulation layer must meet minimum electrical standards, the major contribution of the polyamide jacketing is chemical resistance, abrasion resistance and toughness.

The production of such a two-component construction requires the use of two melt extrusion operations. The first melt extrusion operation coats the flexible PVC insulation layer onto the bare wire. This is then followed by a second extrusion operation that coats the polyamide onto the previously deposited flexible PVC layer.

Scrap or reclaimed constructions require that the polyamide layer be stripped and separated from the flexible PVC insulation layer for recycling while the PVC layer is stripped from the wire for recycling. Cross-contamination of the incompatible polyamide in the recycled PVC material and the PVC in the recycled polyamide material are serious problems that often lead to materials that are considered useless and subject to landfill waste disposal.

The present invention eliminates the need for a two layer construction and, as a result, the two melt extrusion operations can be reduced to a single melt extrusion operation using the compositions of this invention, thus greatly simplifying the extrusion process.

The second benefit is elimination of the necessity of separating the polyamide jacket from the flexible PVC insulation layer during the recycling operation.

The third benefit is the elimination of the cross-contamination that can occur between the polyamide jacket material and the flexible PVC material during recycling which, in turn, reduces the quantities of materials subject to disposal as landfill waste.

It has been determined that a wide range of compositions composed of vinyl halide, a polyamide which has a melting point of less than about 220° C., and an ethylene polymer having carbon monoxide and/or carboxyl functionality, the ethylene polymer being added to compatibilize the halide polymer with the polyamide, provide most of the physical attributes that are required for wire and cable insulation. Across a wide range of compositions, they provide toughness as measured by notched izod and they provide flexibility, as measured by brittle point.

It has now been discovered, however, that good chemical resistance, as measured by exposure (soaking for 7 days at room temperature) to Fuel C (a 50/50 mixture of isooctane and toluene), is surprisingly only attained when the proportions of halide polymer, ethylene polymer and polyamide are kept in relatively restricted proportions. Particularly, the composition must be relatively polyamide-rich.

Various constructions comprised of a coating of the composition of the present invention can be made. For example the composition may be coated onto a wire substrate, it may be made into a sheeting membrane, it may be used as a pipe liner, or it may be formed containers.

The polyamide present in the composition of the present invention should be in an amount of about 1.5 to about 2 times, preferably about 1.75 to about 2 times, (on a weight basis) the halide polymer present. These compositions should also contain an ethylene polymer to compatibilize the polyamide/halide polymer blend.

The amount of the ethylene polymer incorporated into the melt blend should be an amount effective to compatibilize the halide polymer and the polyamide, one with the other. Typically this amount will be within the range of up to about 80 weight percent based on the weight of the halide polymer. When higher melting polyamides, such as Nylon 6, are included in the blend, higher amounts of ethylene polymer preferably should be used to achieve an effectively compatibilized blend, say 20 to 80, preferably 40 to 60, weight percent based on weight of the halide polymer. When lower melting point polyamides, such as the MPMD, 6 and MPMD, 12 nylons, are included in the blend, lower amounts of the ethylene polymer should be effective, say 1 to 40, preferably 1 to 20, weight percent based on weight of the halide polymer. Also, preferred compositions can be obtained with some polyamides and halide polymers when the ethylene polymer is present at a level of about 20 to about 50 weight percent based on the weight of the halide polymer.

Particularly preferred compositions are those of polyamide, halide polymer and ethylene copolymer (and stabilizers and other additives used in the art) in which the polyamide comprises more than about 45% (on total polymer weight basis). These compositions achieve volume swell values of less than about 20% with retention of tensile strengths of greater than about 60%. Compositions of these three polymers containing less than about 45% polyamide (on total polymer weight basis) absorb much greater quantities of Fuel C, typically greater than 30% and have retention of tensile strength of only about 55% or less. Preferred compositions of these three polymers (and their stabilizers and additives) will contain up to about 65 weight percent (on a polymer weight basis) of the polyamide component.

The vinyl halide or vinylidene halide polymer preferably contains chlorine as the halogen moiety. Polyvinyl chloride (PVC) is the most widely available chloride polymer used as wire insulation and, hence, is preferred in the present invention. The PVC can be a homopolymer of vinyl chloride or a copolymer thereof with a small amount, e.g., up to 20 weight percent, of another copolymerizable monomer such as vinyl acetate or ethylene which does not change the essential character of the homopolymer. The PVC will generally have a glass transition temperature (Tg) of about 80° C. and will normally be melt processed by itself at a temperature of 180–200° C. Polyvinylidene chloride has a higher melt processing temperature, but is somewhat less thermally stable than PVC. In accordance with the present invention, in which other polymer components are present, the halide polymer can withstand higher melt processing temperatures for limited periods of time which are nevertheless sufficient time to accomplish the melt blending, without appreciable or detectable degradation of the halide polymer.

The polyamide component is one which is melt processible at a temperature of less than about 220° C. Some polyamides are melt processible at temperatures less than about 200° C. The melt processing temperature of the polyamide is the temperature at which the viscosity of the polyamide is low enough that it can be deformed and compacted into a unitary, essentially void-free mass. This is not a specific melt viscosity but is a melt viscosity range at which these results can be obtained, which enables the melt processing of the composition of the invention to be carried out. In the case of crystalline polyamide, this viscosity is reached by the melt processing temperature exceeding the melting point (melting point determined by Differential Scanning Calorimetry (DSC) of the polyamide). In the case of amorphous polyamide, which may also contain a crystalline polyamide phase, this viscosity is reached at temperature above the Tg of the polyamide at which the polyamide softens sufficiently to provide the viscosity desired for melt blending. The relatively low melt processing temperature of the polyamides used in the present invention opens the door for the possibility of the halide polymer and polyamide being melt blended without degradation of the halide polymer. The most popular polyamide, polyhexamethylene adipamide (Nylon 66) melting at 255° C., cannot be used because of its high melting point. Examples of polyamides having sufficiently low melt processing temperatures include polydodecamethylene dodecanoamide (Nylon 1212) which has a melting point of 184° C., polycaprolactam (Nylon 6) which has a melting point of about 215° C. polydodecanolactam (Nylon 12) melting at 180° C., polyhexamethylene dodecanoamide (Nylon 6,12) melting at 210° C., polydecamethylene sebacamide (Nylon 10,10) melting at 216° C., polyundecanoamide (Nylon 11) melting at 185° C., poly 2-methylpentamethylene adipamide (MPMD, 6) melting at 180° C., poly 2-methylpentamethylene dodecanoamide (MPMD, 12) melting at 160° C. and polyhexamethylene sebacamide (Nylon 6,10) melting at 215° C. and the amorphous polyamides prepared by copolymerizing (condensation polymerizing) a mixture of diacids, such as adipic and isophthalic acids, with hexamethylene diamine.

Despite the higher melting point of some of these polyamides as compared to halide polymer, it has been found that it is possible to melt blend them together at the higher melt processing temperatures that may be required by the polyamide without the halide polymer degrading.

The third component of the melt blend, i.e., the functionalized ethylene polymer, promotes this melt blending by its presence in the melt blend, which improves the ability of the halide polymer and polyamide to be thoroughly dispersed within one another without any appreciable degradation of the halide polymer. The ethylene polymer may also aid the thorough mixing of the other polymer components by reducing the melt viscosity of the melt blend.

Preferably, the ethylene polymer is miscible with the halide polymer in the melt blending process, whereby under magnification, the melt blend (upon cooling) has only two phases that are visible, the halide polymer phase and the polyamide phase. When about equal amounts of the halide polymer and polyamide are present, the melt blend result is an intimate blend of co-econtinuous phases of these polymers, otherwise the melt blend result is a fine dispersion of one of the polymers in a matrix of the other polymer which is present in the greater amount. The miscibility of the ethylene polymer with the halide polymer tends to promote the halide polymer as the matrix phase or co-continuous phase, even when the amount of polyamide somewhat exceeds the amount of halide polymer, depending on the amount of ethylene polymer that is present.

The compatibilizing effect of the ethylene polymer is manifested by intimate, essentially void-free contact between the halide polymer and polyamide phases of the melt blend and, thus, of articles fabricated therefrom, and by a toughness which is greater than either of the halide or polyamide components.

The ethylene polymer achieves its compatibilizing effect in part by being compatible with, preferably miscible with, the halide polymer, and with the carboxyl or carbon monoxide functionality of the ethylene polymer providing interaction with the polyamide. The carboxyl (coo-) and carbon monoxide functionalities are believed to covalently bond and hydrogen bond, respectively, with the polyamide. Preferably, the ethylene polymer contains both carboxyl and carbon monoxide groups.

Examples of carboxyl-functionalized ethylene polymer are copolymers of ethylene with $C_3$–$C_{12}$ ethylenically unsaturated monocarboxylic acids, $C_1$–$C_{18}$ alkyl esters of ethylenically unsaturated $C_3$–$C_{12}$ monocarboxylic acids, and vinyl esters of $C_3$–$C_{18}$ saturated carboxylic acids. More specific examples include ethylene/vinyl acetate copolymer ethylene/alkyl (meth)acrylic acid copolymer, wherein the alkyl group contains 1 to 8 carbon atoms. Such ethylene polymers include copolymer of ethylene with methyl acrylate, propyl acrylate, n-butyl acrylate, hexyl acrylate, or n-butyl acrylate and/or the corresponding free acids. For these polymers, the proportion of ethylene will generally be about 30 to 60 weight percent, with the carboxyl functionality being about 40 to 70 weight percent, to total 100 weight percent of the copolymer.

Preferably the ethylene polymer is also functionalized with carbon monoxide which enables a small amount of acetate, acrylate, or acrylic acid comonomer to be used, to obtain the hydrogen bonding with the polyamide necessary for compatibilization. Preferred such polymers are ethylene/alkyl (meth) acrylate/carbon monoxide copolymer wherein the alkyl group can have the identities described above. Also preferred are ethylene/vinyl acetate/carbon copolymers. Generally for these copolymers the proportion of ethylene will be about 50 to 70 weight percent, the proportion of acid, acrylate, or acetate will be about 24 to 40 weight percent, and the proportion of carbon monoxide will be about 5 to 15 weight percent, to total 100 weight percent of the ethylene polymer.

The ethylene carboxyl and/or carbon monoxide-functional copolymer preferably is also anhydride modified, i.e., it contains carboxylic acid anhydride groups pendant from the polymer backbone. Anhydride modification typically is obtained by grafting reaction between the preformed copolymer with maleic acid or maleic anhydride to form succinic anhydride groups on the copolymer by conventional procedures. Typically, the amount of anhydride modification will be about 0.1 to 5 weight percent based on the weight of the copolymer. The most preferred ethylene polymer is ethylene/alkyl acrylate/CO copolymer modified with succinic anhydride, wherein the alkyl group has 1 to 4 carbon atoms, and is preferably n-butyl acrylate.

The anhydride modification of the functionalized ethylene polymer provides better bonding to the polyamide phase, believed to result from chemical reaction between the anhydride groups with the polyamide.

The melt blending of the three components can be carried out using conventional equipment such as extrusion screws in an extruder or injection molding machine. Preferably these components are pre-blended such as by dry mixing together of the halide polymer, which is in powder form, with typical halide polymer stabilizers. Followed by melt blending the stabilized halide polymer powder with the polyamide and the ethylene polymer. The polyamide and ethylene polymers will typically be in the form of molding granules. Conventional additives such as an antioxidant can also be present in the melt blend.

The melt blending is typically carried out in conventional plastics melt compounding equipment such as batch mixers, twin screw extruders and single screw kneaders.

The melt blends of compositions of the present invention can be melt fabricated into a wide variety of articles by conventional processes such as extrusion and injection molding into such forms as wire coatings, tubes, pipe liners, sheets, films and molded articles such as containers.

In the following Examples of the invention, parts and percents are by weight unless otherwise indicated.

EXAMPLE 1

In the series of experiments covered by this Example the PVC used was VISTA 5305 having an inherent viscosity of 0.74 (ASTM 1243) and a Tg of about 80° C. This PVC powder was blended in a powder mixer (WELEX) with the following stabilizers: 2.7% butyl tin mercaptin (MARK 1900), 0.9% thioester (SEENOX 412S) and 0.9% hindered phenol (IRGANOX 1098). Also added to the PVC powder mix was a wax lubricant (HOECHST WAX E) at 2.7% and a flame retardant additive (THERMOGUARD CPA) at 4.4%. All values are weight percents based on the weight of the total PVC powder blend. The polyamide used was nylon 12 available as RILSAN AESNO TL and having a melting point of 180° C. The ethylene polymer was 60 weight percent ethylene, 30 weight percent n-butyl acrylate, and 10 weight percent carbon monoxide grafted with 0.9 weight percent succinic anhydride groups available as FUSABOND MG-175D.

Compositions were prepared on a 46 mm Buss Kneader having an length to diameter ratio of 16 to 1. The kneader was equipped with two feed ports; one at the upstream end of the machine, as is customary, and a second one positioned downstream at a distance of about one-half the length of the machine or about 8 diameter lengths from the first feed port. The nylon pellets and the ethylene polymer pellets were fed together into the first feed port and the PVC powder blend was fed into the second feed port.

The ingredients were metered so that the rate of production of the final composition was about 50 pounds per hour. The temperature of the molten polymer ingredients was controlled by the barrel heaters of the kneader and the rpm of the screw. The set temperatures between the first feed port and the second feed port were set in a downhill temperature profile starting at about 275° C. and decreasing to about 170° C. This facilitated the rapid melting and homogenization of the nylon and ethylene polymers added at the first feed port.

It also sufficiently cooled this melt to about 180° C. by the time it reached the second feed port. This allowed the safe introduction of the PVC powder blend at the second feed port without exposing the heat sensitive PVC to excessive temperatures. The remainder of the kneader length was heated at about 150° C. so that the resulting homogeneous three component polymer blend developed a melt temperature in a range below or not to excessively exceed 200° C.

The screw speed was typically 310 RPM and the screw temperature was 150° C.

The molten blend, exit the kneader, was fed to a low shear and relatively cool (~160° C.) single screw extruder which pumped the melt through a 4 hole die. The resulting strands of blend were quenched in a water bath and then cut into pellets.

Table 1 shows the results of increasing levels of polyamide (Nylon 12) in blends of PVC with the ethylene copolymer compatibilizer.

Test specimens were compression molded from the pellets produced on the Buss kneader. Tensile strength, elongation and resistance to Fuel C were measured (Table 1).

TABLE 1

|  | A | B | C | D |
|---|---|---|---|---|
| PVC | 56.2 | 47.0 | 38.0 | 27.6 |
| Nylon 12 | 18.7 | 23.5 | 38.0 | 55.1 |
| Ethylene polymer | 18.7 | 23.5 | 19.1 | 13.8 |
| Stabilizers and additives | 6.4 | 6.0 | 4.9 | 3.5 |
| Fuel C, 7 days |  |  |  |  |
| Volume Swell (%) | 39 | 44 | 31 | 6.3 |
| Retention of Tensile Strength (%) | 56 | 50 | 56 | 92 |
| Retention of Elongation (%) | 192 | 87 | 51 | 83 |
| Orig. Tensile Strength (MPa) | 20.8 | 19.1 | 26.1 | 30.7 |
| Orig. Elongation (%) | 131 | 274 | 353 | 316 |

It is quite clear that at a polyamide level of about 40% (polymer basis) or below (Samples A through C) the volume swell in the chemically aggressive Fuel C exceeds 30%. Concurrent with this volume increase is a decrease in tensile strength of about 40% or more. To the contrary, at a level of polyamide of 57% (total polymer basis), that is, at a polyamide level of 2 times the weight of PVC, the volume swell is only 6% and the tensile strength decreases only 8%, a five-fold improvement in chemical resistance.

EXAMPLE 2

In the series of experiments covered by this Example the PVC used was VISTA 5265 having an inherent viscosity of 0.68 (ASTM 1243) and a Tg of about 80° C. This PVC powder was blended in a powder mixer (WELEX) with the following stabilizers: 3.7% butyl tin mercaptin (MARK 1900), 1.0% thioester (SEENOX 412S) and 1.0% hindered phenol (IRGANOX 1098). Also added to the PVC powder mix was a wax lubricant (HOECHST WAX E) at 2.8%. All values are weight percents based on the weight of the total PVC powder blend.

Compositions were prepared by adding the ethylene copolymer, polyamide (dried) to a Haake 90 mixer. The mixer set temperature was 180° C. and the rpm was set at 50. After all of the ingredients were added (less than one minute), the mixer temperature was set at 205° C. and the rpm raised to 200. Mixing was continued until the mixture became uniformly molten which occurred at about 200° C. in about 8 minutes. The set temperature was then decreased to 185° C. and the rpm lowered to 75. The mixture temperature decreased to about 205° C. (in about 3 minutes). The PVC was then added and the composition was mixed for about 5 minutes or until homogeneity became evident. During this time the temperature was kept below 205° C. by adjustment of the rpm. The sample was then discharged and quenched in dry ice. Test specimens were compression molded from the compositions prepared in the Haake mixer for testing notched Izod impact strength, elongation, tensile strength and resistance to Fuel C.

TABLE 2

|  | E | F | G | H |
|---|---|---|---|---|
| PVC | 27.9 | 32.4 | 27.9 | 32.4 |
| Nylon 12 | 55.7 | 48.5 |  |  |
| Nylon MPMD, 6 |  |  | 55.7 | 48.5 |
| Ethylene polymer | 13.9 | 16.2 | 13.9 | 16.2 |
| Stabilizers & additives | 2.5 | 2.9 | 2.5 | 2.9 |
| Fuel C, 7 days |  |  |  |  |
| Volume Swell (%) | 12 | 18 | 6.2 | 16 |
| Retention of Tensile Strength (%) | 79 | 65 | 84 | 75 |
| Retention of Elongation (%) | 114 | 106 | 125 | 112 |
| Orig. Tensile Strength (MPa) | 47.2 | 46.6 | 42.3 | 39.9 |
| Orig. Elongation (%) | 262 | 273 | 275 | 298 |
| Notched Izod (J/m) | no bk. | no bk. | no bk. | no bk. |

It is evident from the samples G and H (Table 2) the nylon MPMD, 6 is also very resistant to Fuel C and even matches or even exceeds comparable blends of nylon 12 (Samples E and F). These blends composed of polyamide of about 50% (or more), have Fuel C volume swell values of below 20% and retain tensile strengths of greater than about 65%. These compositions prove to be very tough as indicated by the lack of breakage as measured by t he Notch Izod test.

EXAMPLE 3

In this example, the PVC (VISTA 5305) was blended with 3.7% butyl tin mercaptin (MARK 1900), 0.9% hindered phenol (IRGANOX 1098), 0.9% thioester (SEENOX 412S) and 2.8% wax lubricant (HOECHST WAX E).

The polyamide used was nylon MPMD, 12. The ethylene polymer was 60 weight percent ethylene, 30 weight percent n-butyl acrylate and 10 weight percent carbon monoxide grafted with 0.9 weight percent succinic anhydride groups available as FUSABOND MG-233D.

Compositions were prepared in a manner similar to Example 1. Tensile strength, elongation and notched Izod impact strength were measured and are reported in Table 3.

TABLE 3

|  | I | J |
|---|---|---|
| PVC | 27.9% | 21.7% |
| Nylon MPMD, 12 | 55.7% | 65.4% |
| EnBACO-g-MAH | 13.9% | 10.9% |
| Stabilizers and additives | 2.5% | 2.0% |
| Tensile Strength at break, Mpa | 39.3% | 29.6% |
| Elongation, at break, % | 312 | 250 |
| Notched Izod, J/m | No Break | 320 |

Table 3 shows that the tensile strength at break, elongation and notched Izod impact strength were superior in sample I, where the polyamide is present in a weight amount of 2.0 times the weight amount of the halide polymer. In sample J, the polyamide is present in a weight amount of 3.0 times the weight amount of the halide polymer.

What is claimed is:

1. A construction comprised of a coating of a composition comprising vinyl or vinylidene halide polymer, thermoplastic polyamide and ethylene polymer having carbon monoxide and/or carboxyl functionality to compatibilize the halide polymer with the polyamide upon melt blending, wherein the polyamide is melt processible at a temperature of less than about 220° C. and is present in a weight amount of about 1.5 to about 2 times the weight amount of the halide polymer, and the ethylene polymer is present in an effective amount up to about 80 weight percent of the halide polymer.

2. A construction comprised of a sheeting membrane made from a compositio comprising vinyl or vinylidene halide polymer, thermoplastic polyamide and ethylene polymer having carbon monoxide and/or carboxyl functionality to compatibilize the halide polymer with the polyamide upon melt blending, wherein the polyamide is melt processible at a temperature of less than about 220° C. and is present in a weight amount of about 1.5 to about 2 times the weight amount of the halide polymer, and the ethylene polymer is present in an effective amount up to about 80 weight percent of the halide polymer.

3. A construction comprised of a pipe liner made from a compositiong comprising vinyl or vinylidene halide polymer, thermoplastic polyamide and ethylene polymer having carbon monoxide and/or carboxyl functionality to compatibilize the halide polymer with the polyamide upon melt blending, wherein the polyamide is melt processible at a temperature of less than about 220° C. and is present in a weight amount of about 1.5 to about 2 times the weight amount of the halide polymer, and the ethylene polymer is present in an effective amount up to about 80 weight percent of the halide polymer.

4. A container made from a composition comprising vinyl or vinylidene halide polymer, thermoplastic polyamide and ethylene polymer having carbon monoxide and/or carboxyl functionality to compatibilize the halide polymer with the polyamide upon melt blending, wherein the polyamide is melt processible at a temperature of less than about 220° C. and is present in a weight amount of about 1.5 to about 2 times the weight amount of the halide polymer, and the ethylene polymer is present in an effective amount up to about 80 weight percent of the halide polymer.

* * * * *